US008600426B2

(12) United States Patent
Gaal et al.

(10) Patent No.: US 8,600,426 B2
(45) Date of Patent: Dec. 3, 2013

(54) POWER CONTROL ON A DEACTIVATED COMPONENT CARRIER

(75) Inventors: Peter Gaal, San Diego, CA (US); Aleksandar Damnjanovic, Del Mar, CA (US); Wanshi Chen, San Diego, CA (US); Juan Montojo, San Diego, CA (US); Jelena M. Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 292 days.

(21) Appl. No.: 13/223,095

(22) Filed: Aug. 31, 2011

(65) Prior Publication Data

US 2012/0058797 A1 Mar. 8, 2012

Related U.S. Application Data

(60) Provisional application No. 61/379,337, filed on Sep. 1, 2010.

(51) Int. Cl.
*H04B 7/00* (2006.01)

(52) U.S. Cl.
USPC ................................ 455/522; 455/68; 455/69

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS 7,136,627 B2 * 11/2006 Hamalainen et al. ......... 455/101
7,280,511 B2 * 10/2007 Ahn .............................. 370/335
2003/0012152 A1 1/2003 Feldman et al.
2005/0114714 A1 * 5/2005 Albulet ......................... 713/300
2005/0260954 A1 * 11/2005 Hamalainen et al. ......... 455/101
2007/0077960 A1 * 4/2007 Jain et al. ................... 455/550.1
2007/0183786 A1 * 8/2007 Hinosugi et al. .............. 398/140
2010/0067434 A1 3/2010 Siu et al.
2011/0105107 A1 5/2011 Kwon et al.
2011/0134774 A1 6/2011 Pelletier et al.

FOREIGN PATENT DOCUMENTS

WO WO2008052201 5/2008
WO WO2010025681 A1 3/2010
WO WO2010068487 6/2010

OTHER PUBLICATIONS

Ericsson: "DC-HSUPA initial power and ramping", 3GPP Draft; R1-091893 DC-HSUPA Initial Power and Ramping, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339384, [retrieved on Apr. 28, 2009].
International Search Report and Written Opinion—PCT/US2011/050207—ISA/EPO—Nov. 16, 2011.

* cited by examiner

*Primary Examiner* — Dominic E Rego
(74) *Attorney, Agent, or Firm* — Seyfarth Shaw LLP

(57) ABSTRACT

A wireless communication system implementing Carrier Aggregation (CA) allows activation and deactivation of certain component carriers. Transmit power on an uplink component carrier being reactivated may be controlled by predetermining appropriate power control parameters to be used upon reactivation. The predetermined power control parameters may depend on a last known power control state of the deactivated component carrier or may be reset to apply an initial low power state.

40 Claims, 12 Drawing Sheets

POWER CONTROL ON A DEACTIVATED COMPONENT CARRIER

CROSS-REFERENCE TO RELATED APPLICATION

This application claims the benefit under 35 U.S.C §119(e) to U.S. Provisional Patent Application No. 61/379,337 entitled "POWER CONTROL ON A DEACTIVATED COMPONENT CARRIER," filed on Sep. 1, 2010, the disclosure of which is expressly incorporated by reference herein in its entirety.

BACKGROUND

1. Field

Aspects of the present disclosure relate generally to wireless communication systems, and more particularly, to uplink power control in a Carrier Aggregation (CA) configuration.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

An aspect of the present disclosure provides a method of wireless communication by a multicarrier user equipment (UE). The method includes determining power control parameters for a component carrier configured for the UE when the component carrier is in an activated state and deactivating the component carrier after determining the power control parameters. The method then includes selecting a most recent power control parameter value for the deactivated component carrier from the determined power control parameters in response to a reactivation command for the deactivated component carrier, and applying the selected power control parameter value to establish a power control adjustment state of the UE. The method further includes reactivating the deactivated component carrier in the established power control adjustment state.

Another aspect of the present disclosure provides a multicarrier user equipment (UE). The apparatus includes means for determining power control parameters for a component carrier configured for the UE when the component carrier is in an activated state, and means for deactivating the component carrier after determining the power control parameters. The UE also includes means for selecting a most recent power control parameter value for the deactivated component carrier from the determined power control parameters in response to a reactivation command for the deactivated component carrier, and means for applying the selected power control parameter value to establish a power control adjustment state of the UE. The UE further includes means for reactivating the deactivated component carrier in the established power control adjustment state.

Another aspect of the present disclosure provides a computer program product for a multicarrier user equipment (UE). The computer program product includes a computer-readable medium having program code recorded thereon. The program code includes program code to determine power control parameters for a component carrier configured for the UE when the component carrier is in an activated state, and program code to deactivate the component carrier after determining the power control parameters. The program code also includes program code to select a most recent power control parameter value for the deactivated component carrier from the determined power control parameters in response to a reactivation command for the deactivated component carrier, and program code to apply the selected power control parameter value to establish a power control adjustment state of the UE. The program code further includes program code to reactivate the deactivated component carrier in the established power control adjustment state.

Another aspect of the present disclosure provides a multicarrier user equipment (UE). The UE includes at least one processor and a memory coupled to the processor(s). The processor(s) is/are configured to determine power control parameters for a component carrier configured for the UE when the component carrier is in an activated state and to deactivate the component carrier after determining the power control parameters. The processor(s) is/are also configured to select a most recent power control parameter value for the deactivated component carrier from the determined power control parameters in response to a reactivation command for the deactivated component carrier, and to apply the selected power control parameter value to establish a power control adjustment state of a user equipment (UE). The processor(s) is/are further configured to reactivate the deactivated component carrier in the established power control adjustment state.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
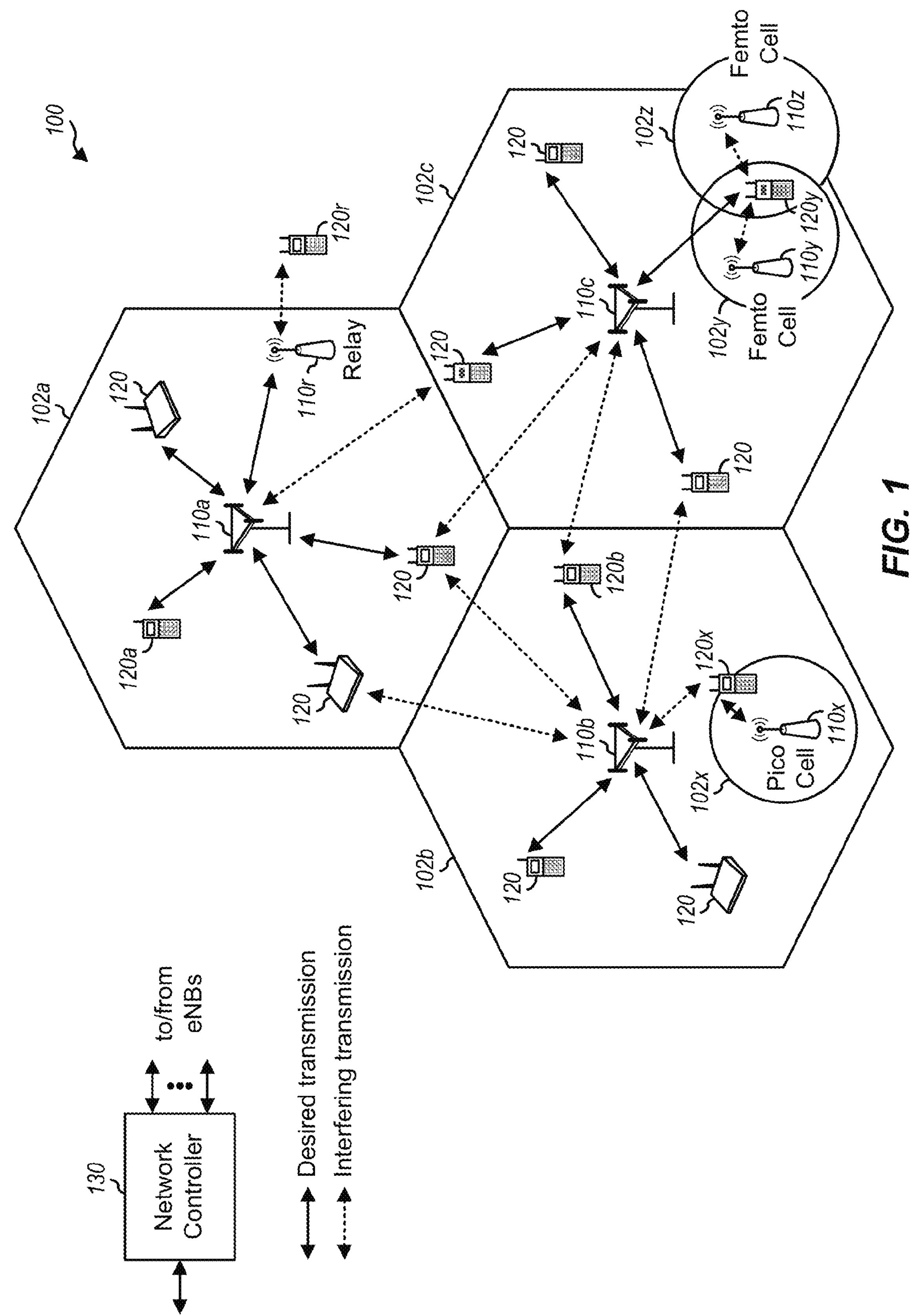
FIG. 1 is a block diagram illustrating an example of a multi-carrier telecommunications system.

FIG. 1 shows a wireless communication network 100, which may be an LTE-A network, in which power control on a deactivated component carrier may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110*a*, 110*b* and 110*c* are macro eNodeBs for the macro cells 102*a*, 102*b* and 102*c*, respectively. The eNodeB 110*x* is a pico eNodeB for a pico cell 102*x*. And, the eNodeBs 110*y* and 110*z* are femto eNodeBs for the femto cells 102*y* and 102*z*, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110*a* and a UE 120*r* in order to facilitate communication between the eNodeB 110*a* and the UE 120*r*. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

As shown, an eNodeB 110 may communicate with a UE 120 on multiple component carriers (CCs). A CC may refer to a range of frequencies used for communication in the wireless network 100 and may include downlink CCs and uplink CCs. For example, an eNodeB 110*a* may send control and data transmissions on multiple downlink CCs to a UE 120*a* within its coverage area. The UE 120*a* may receive and decode the data transmissions. The UE 120*a* may acknowledge the downlink transmissions on one or more uplink CCs.

An eNodeB 110 can change the number of CCs available for a UE 120 from time to time. For example, the eNodeB 110 can change the carrier configuration for a UE 120 by adding or removing individual CCs. In some instances, CC configuration or reconfiguration can be accomplished via higher layer signaling such as by sending one or more RRC messages to a UE 120. Because changing the CC configuration may be a relatively slow process, as described herein, an eNodeB 110 may instead activate or deactivate a carrier which has already been configured for use by a particular UE 120. Activation or deactivation may be accomplished relatively quickly (e.g., in a number of milliseconds) via downlink commands from the eNodeB 110. While a CC is deactivated, the UE 120 may save power by limiting its monitoring of the deactivated CC. For example, a UE 120 reduces the frequency with which it performs path loss measurements for purposes of power control and/or may discontinue monitoring for power control commands affecting the deactivated CC.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
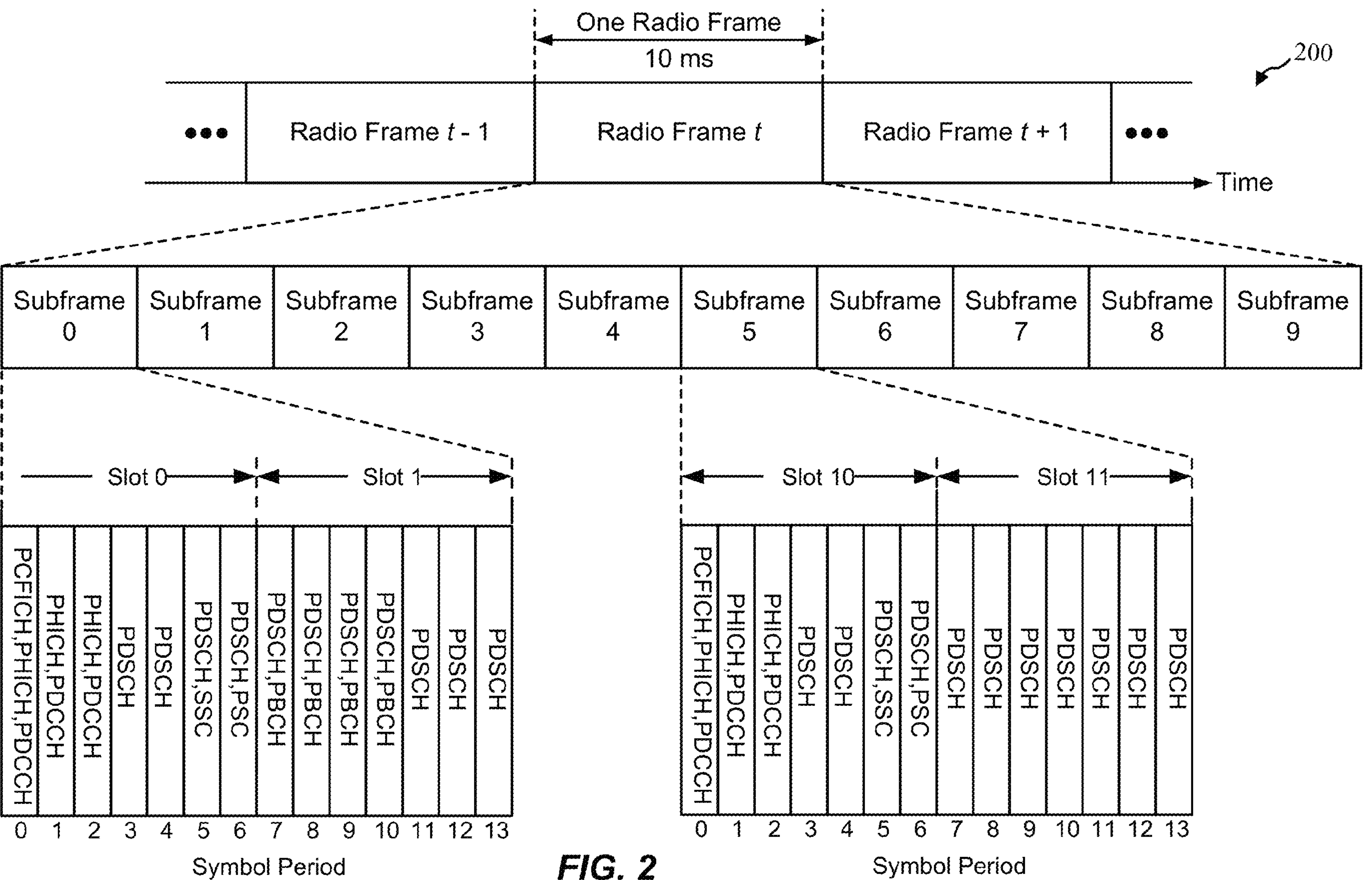
FIG. 2 is a diagram illustrating an example of a downlink frame structure in a telecommunications system.

FIG. 2 shows a downlink FDD frame structure 200 used in LTE. Frame structure 200, for example, may correspond to one downlink CC on which an eNodeB 110 communicates with a UE 120 in wireless network 100.

The downlink transmission timeline shown in FIG. 2 may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

Power control information for a deactivated component carrier may also be provided to the UE within the frame structure 200. For example, a UE 120*b* may be configured with two downlink CCs (CC1, CC2) and one uplink CC for communication with the eNodeB 110*b*. CC1 may be designated as the primary component carrier (PCC) for the UE 120*b* and CC2 may be a secondary component carriers (SCC). The eNodeB 110*b* may send a command to the UE 120*b* causing it to deactivate CC2. While in the deactivated state, the UE 120*b* may cease to monitor control channel transmissions on CC2. The UE 120*b* may receive a reactivation command for and, in response to the reactivation command, may transition CC2 to an activated state. As described herein, the UE 120*b* may determine power control parameters for CC2 while it is in the activated state, establish a power control adjustment state for CC2 upon receiving the reactivation command, and reactivate CC2 in the established power control adjustment state.

Figure 3:
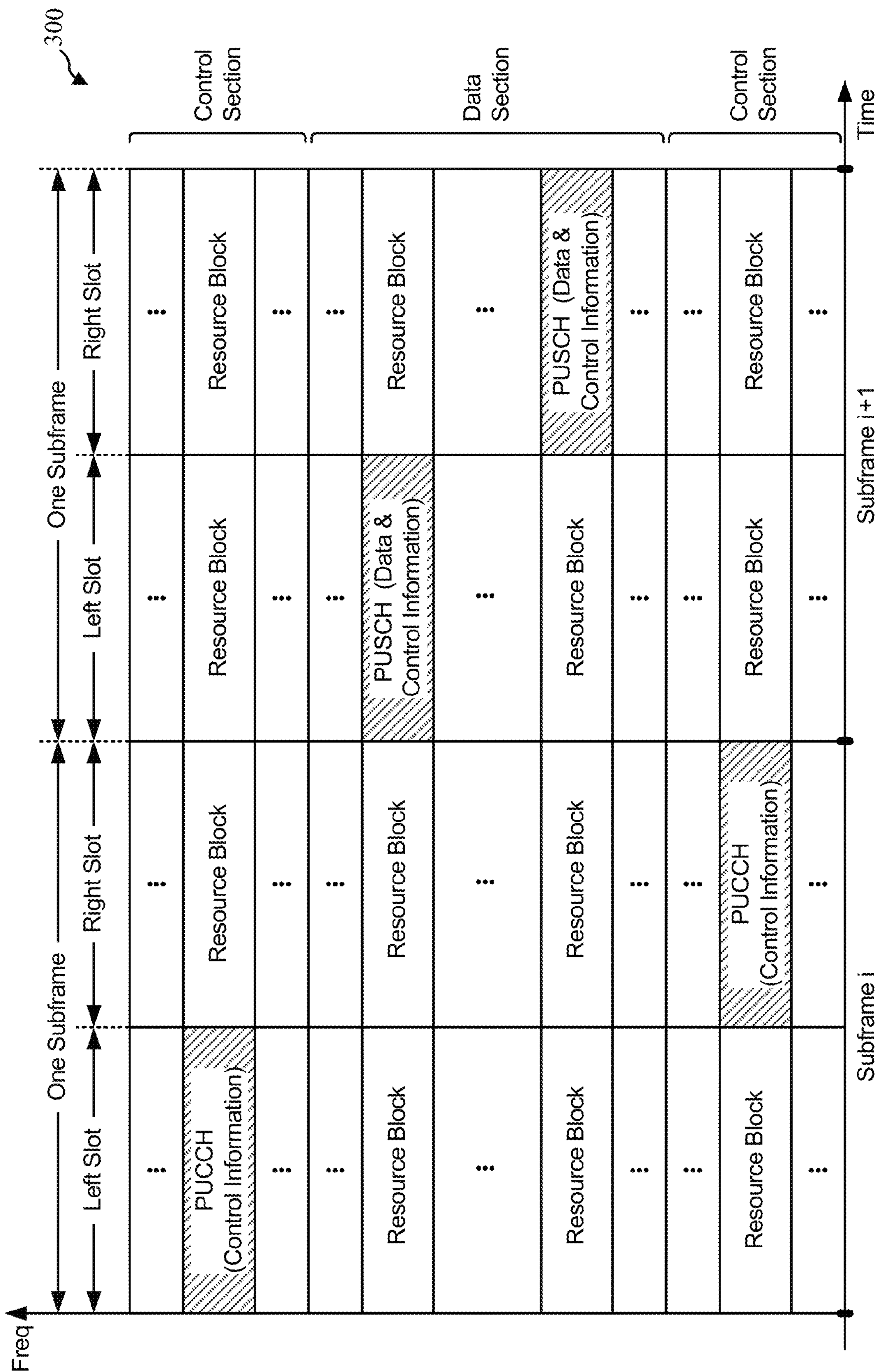
FIG. 3 is a block diagram illustrating an example frame structure in uplink communications.

FIG. 3 is a block diagram illustrating an exemplary uplink frame structure 300 in long term evolution (LTE) communications. The frame structure 300 may be seen in the wireless network 100 in communications of a reactivated component carrier. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
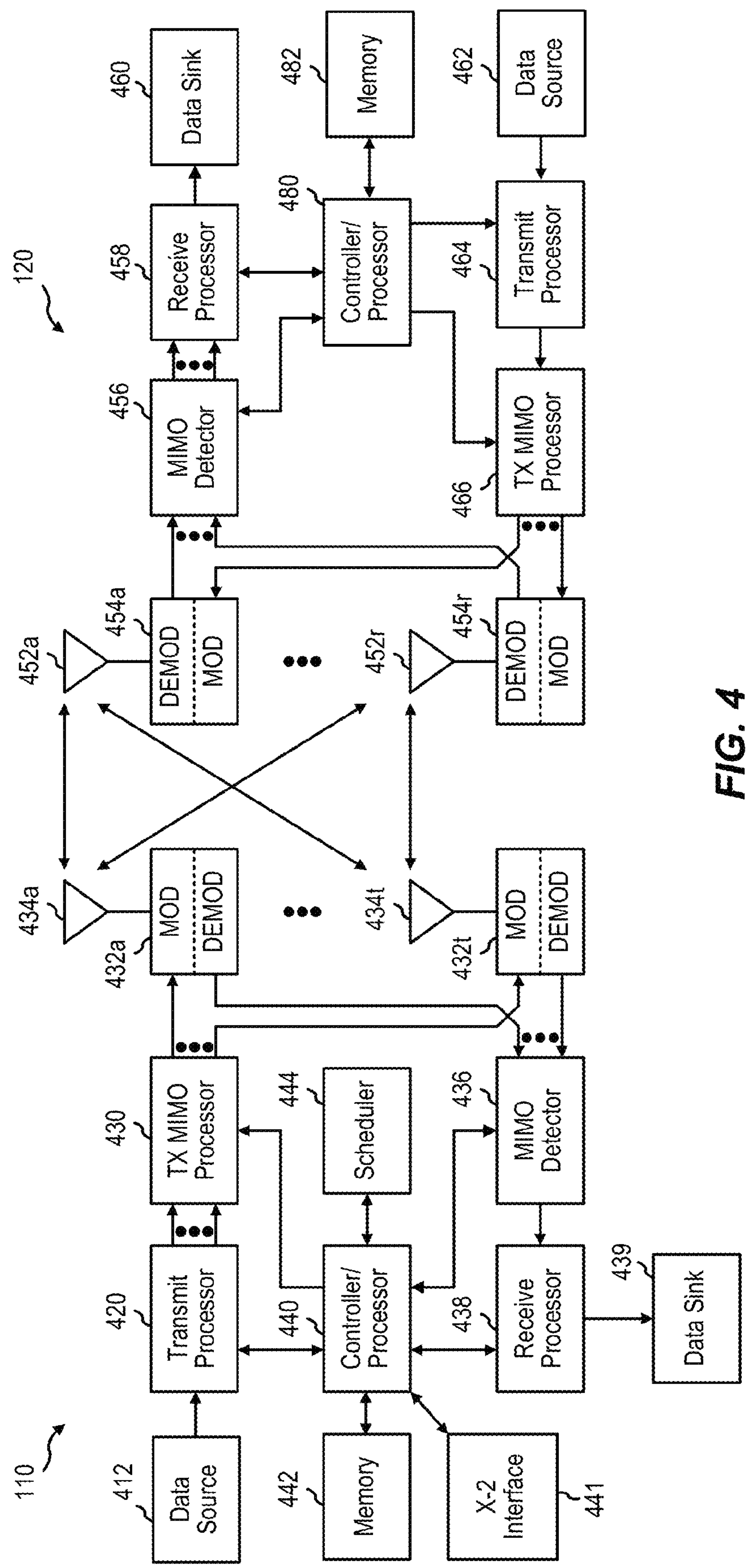
FIG. 4 is a block diagram illustrating a design of a multi-carrier base station/eNodeB and a UE configured according to one aspect of the present disclosure.

FIG. 4 shows a block diagram of a design of a base station/eNodeB 110 and a UE 120 that may implement power control on a deactivated component carrier as described below. The eNodeB and UE may be one of the base stations/eNodeBs and one of the UEs in FIG. 1. For example, the base station 110 may be the macro eNodeB 110*b* in FIG. 1, and the UE 120 may be the UE 120*b*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454*a* through 454*r* (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 8-10, and/or other processes for the techniques described herein. The memories 442 and 482 may store data and program codes for the base station 110 and the UE 120, respectively. A scheduler 444 may schedule UEs for data transmission on the downlink and/or uplink.

LTE-Advanced UEs use spectrum in up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric assignments will conserve spectrum and are a good fit for the typically asymmetric bandwidth utilization by broadband subscribers.

Figure 5A:
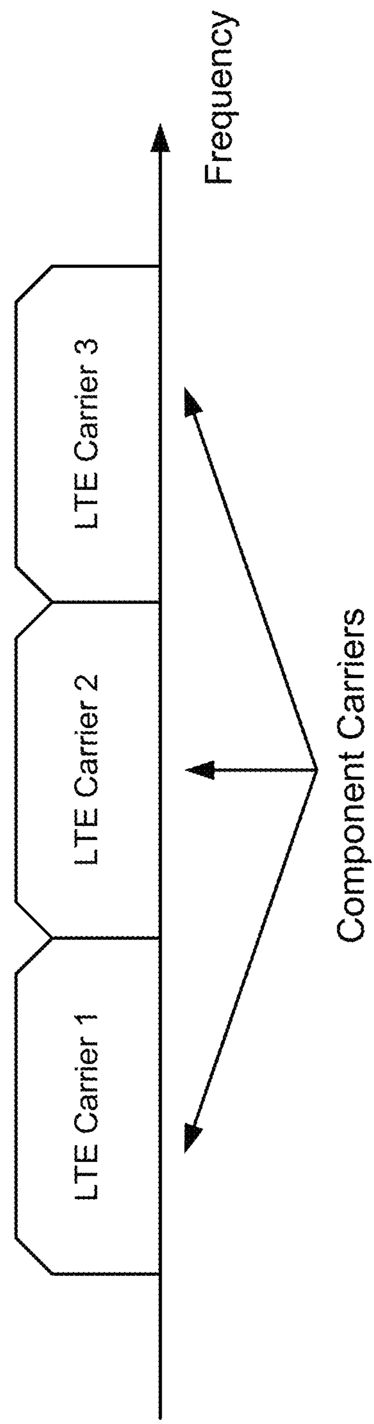
FIG. 5A discloses a continuous carrier aggregation type.
Figure 5B:
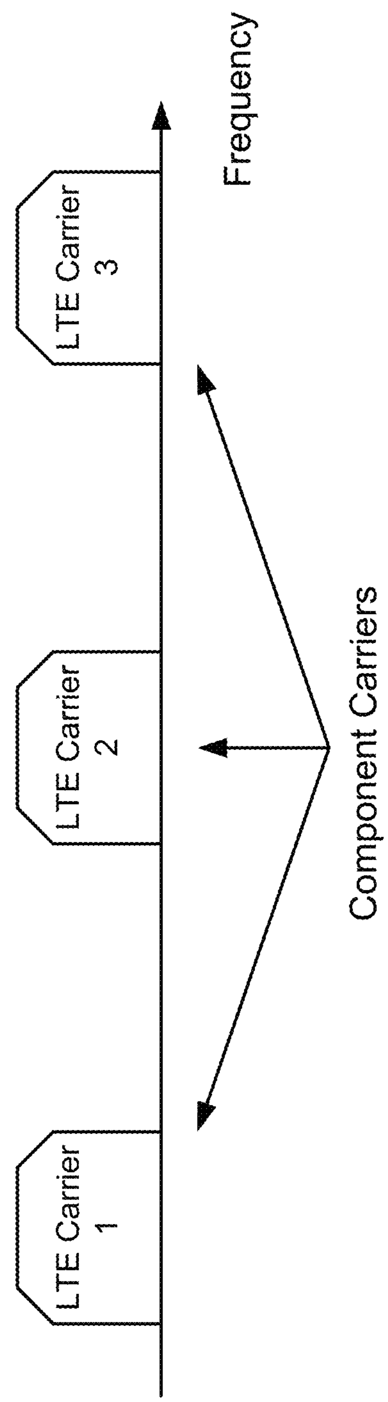
FIG. 5B discloses a non-continuous carrier aggregation type.

For the LTE-Advanced mobile systems, two types of carrier aggregation (CA) methods may be used, continuous CA and non-continuous CA for which power control on a deactivated component carrier may be implemented. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary substantially at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 6:
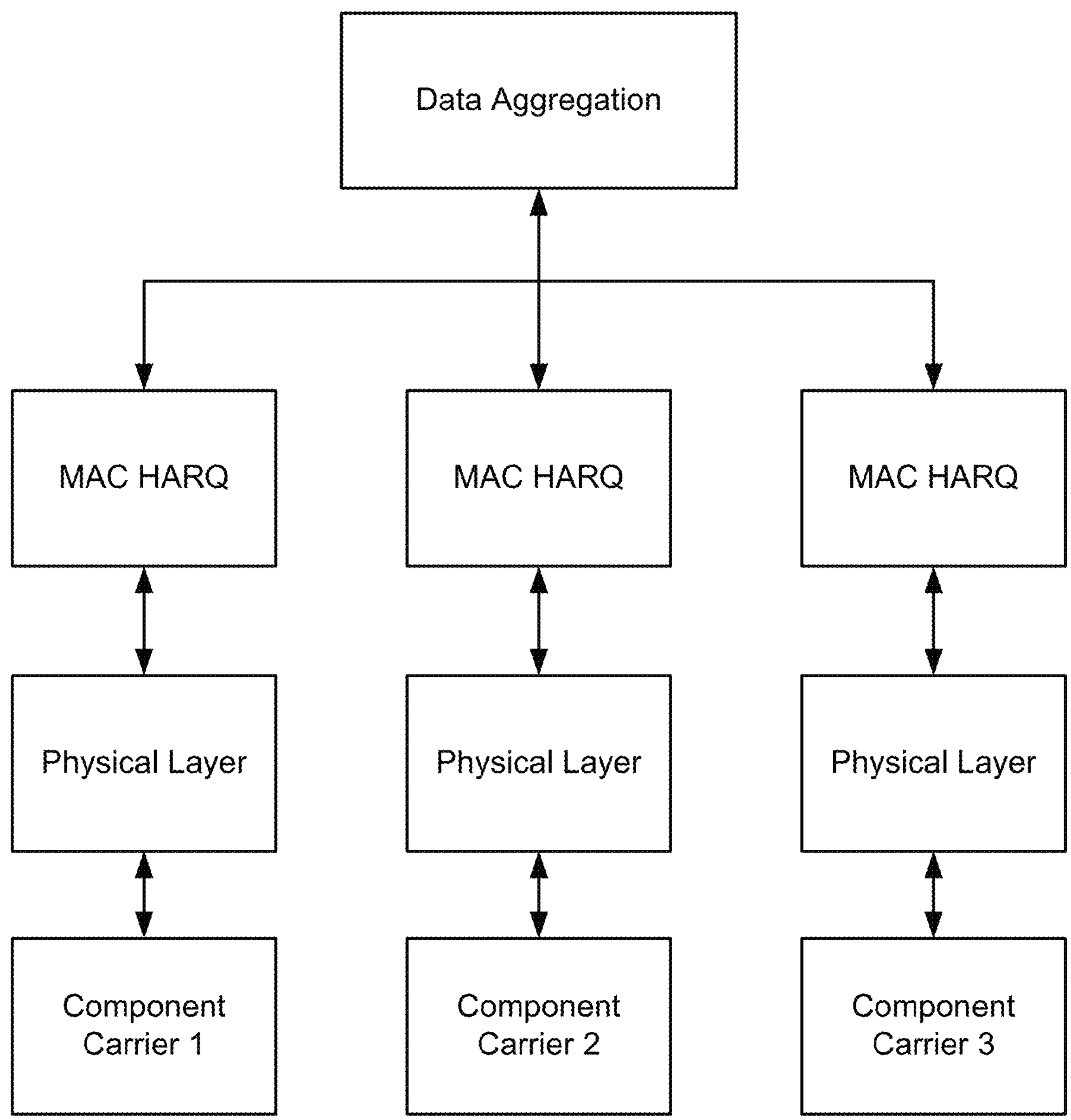
FIG. 6 discloses MAC layer data aggregation.

FIG. 6 illustrates aggregating transmission blocks (TBs) from different component carriers at the medium access control (MAC) layer for an IMT-Advanced system in which power control on a deactivated component carrier may be implemented. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier (e.g., the primary component carrier). The control information for the multiple component carriers will be integrated as the signaling content in this dedicated control channel. As a result, backward compatibility with the control channel structure in LTE systems is maintained, while signaling overhead in the CA is reduced.

With the third approach, multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

As described herein, a UE operating in a multicarrier system (such as the wireless system 100) can be configured to aggregate certain functions of multiple carriers, such as control and feedback functions, on the same carrier, which may be referred to as a "primary component carrier" (PCC). The remaining carriers that depend on the primary component carrier for support are referred to as associated secondary component carriers (SCCs). For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 7:
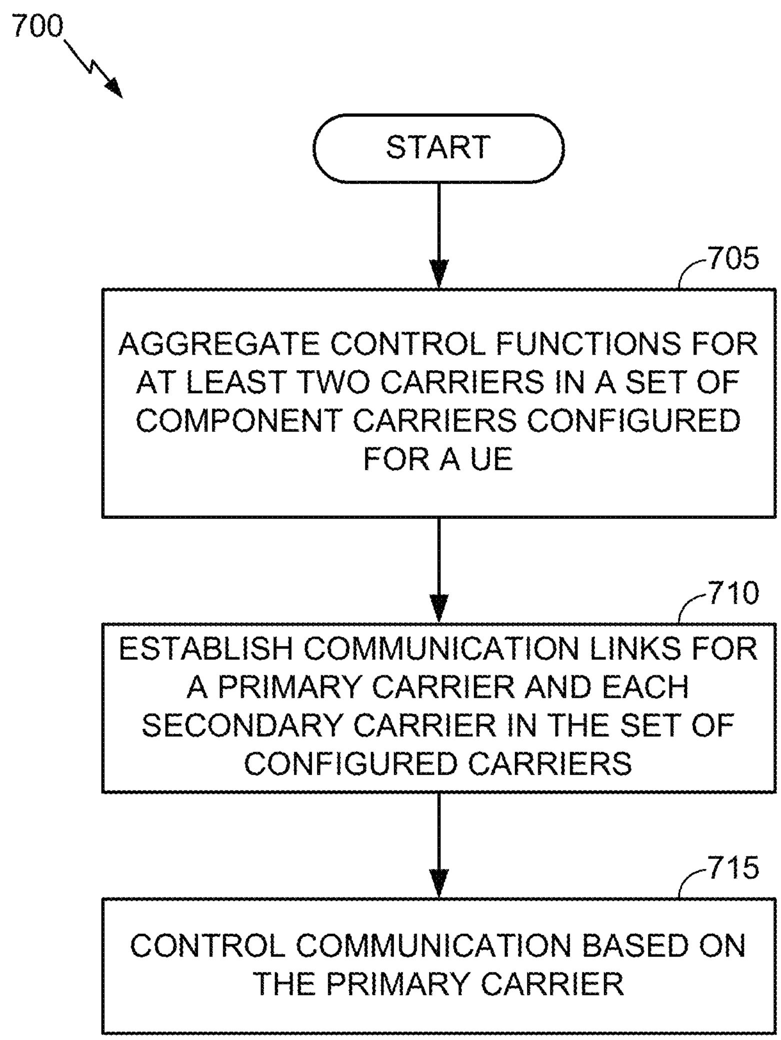
FIG. 7 is a block diagram illustrating a method for controlling radio links in multiple carrier configurations.

FIG. 7 illustrates a method 700 for controlling radio links in a multiple carrier wireless communication system, in which power control on a deactivated component carrier may be implemented, by grouping physical channels according to one example. The method 700 may be performed, for example, by a base station 110, as shown in FIG. 1. The method includes, at block 705, aggregating control functions from at least two component carriers in a set of component carriers configured for a user equipment. Next at block, 710, communication links are established for a designated primary carrier and each secondary carrier. Then, communication is controlled based on the primary carrier in block 715.

As discussed above, a wireless communication network may be configured for Carrier Aggregation (CA) in which uplink and downlink communications between an eNB and a UE are performed on a primary component carrier and one or more secondary component carriers. The primary component carrier is sometimes referred to as a "PCell" and the secondary component carriers are sometimes referred to as "SCells." Particular secondary component carriers may be activated or deactivated to conserve battery power on a UE, for example. Primary component carriers are not deactivated so they are not subject to activation/deactivation considerations.

When a downlink secondary component carrier is deactivated, a UE does not receive a Physical Downlink Control Channel (PDCCH) or a Physical Downlink Shared Channel (PDSCH) corresponding to the deactivated component carrier. The UE may also discontinue (or limit) Channel Quality Indicator (CQI) measurements or sending a CQI report for the deactivated component carrier.

Uplink secondary component carriers may not require explicit activation because a UE should always be able transmit on a Physical Uplink Shared Channel of any secondary component carriers when a transmission is scheduled on a corresponding Physical Downlink Control Channel.

Mechanisms for activating and deactivating secondary component carriers may be based on a combination of a Medium Access Control (MAC) control element and deactivation timers. A UE may receive a Medium Access Control (MAC) level control element from a base station in a downlink subframe, such as shown in FIG. 4. The MAC control element may carry a bitmap for downlink activation and deactivation of secondary component carriers. In the bitmap, a bit set to 1 may denote activation of a corresponding secondary component carrier and a bit set to 0 may denote deactivation of a corresponding secondary component carrier. By using such a bitmap, secondary component carriers can be activated and deactivated individually. Also, a single activation/deactivation command can activate/deactivate a subset of the secondary component carriers.

The UE may also maintain a deactivation timer for each secondary component carrier. The base station may configure the period of the deactivation timer for each UE by Radio Resource Control (RRC) messaging. The deactivation timer of a particular secondary component carrier may be started or restarted when the secondary component carrier is activated or when a Physical Downlink Control Channel on the secondary component carrier indicates an uplink grant or downlink assignment for any component carrier. The uplink grant or downlink assignment may be indicated, for example, upon first transmissions or retransmissions. The deactivation timer of a particular secondary component carrier may also be started or restarted when a Physical Downlink Control Channel on a scheduling downlink component carrier indicates a downlink assignment for the secondary component carrier.

When a UE is reconfigured without mobility control information, secondary component carriers added to a set of serving component carriers may be initially deactivated. Secondary component carriers that remain in the set of serving cells, whether they are unchanged or reconfigured, do not change their activation status. When a UE is reconfigured with mobility control information, such as during a handover, for example, secondary component carriers may be deactivated.

When a downlink secondary component carrier is activated, control and data samples are buffered for that component carrier and corresponding search spaces for assignments are monitored by the UE as defined by the UE configuration. The UE performs Channel Quality Indicator (CQI) measurements on the activated secondary component carrier and sends a Channel Quality Indicator report on configured uplink resources.

When a downlink secondary component carrier is activated, a multi-bit Acknowledgement/Negative-acknowledgement (ACK/NACK) format that corresponds to the number of activated component carriers and their transmit modes may be utilized on the uplink. For example, if three component carriers are activated and the UE is not in a multiple-input multiple output (MIMO) mode, then three ACK/NACK bits may be used, i.e., one ACK/NACK bit is used for each activated carrier. If the UE is in multiple-input multiple-output mode, then two ACK/NACK bits may be used for each activated carrier. A Sounding Reference Signal (SRS) may also be transmitted in accordance with the configuration of the corresponding uplink.

When a downlink secondary component carrier is deactivated, the UE may discontinue monitoring or buffering the Physical Downlink Control Channel and Physical Downlink Shared Channel for the deactivated component carrier. The UE may also limit measurement of channel quality indicators (CQI) or transmission of Channel Quality Indicator reports for the deactivated component carrier. Resources configured for providing channel quality report feedback of deactivated downlink component carrier are left unutilized.

The setting of UE transmit power for an uplink component carrier may be specified in a power control command from an eNodeB upon an initial configuration of the uplink component carrier and may be adjusted in response to channel conditions, for example. A power control parameter that was specified by the eNodeB for the uplink component carrier is stored by the UE and is used to control power whenever the UE transmits on the uplink component carrier. If channel conditions change such that the UE transmit power should be adjusted for the uplink component carrier, the eNodeB specifies an appropriate adjustment by sending a new power control command.

When the component carrier is in an activated state, the UE can receive and store new power control parameters and can begin using the new parameters to control transmissions on the active uplink component carrier as soon as they are received from the eNodeB. Because the eNodeB sends new power control commands when channel conditions change, the power control parameters that are stored by a UE should be appropriate for later transmissions on a component carrier that has not been deactivated. However, when the uplink component carrier is deactivated, the UE does not transmit on the deactivated component carrier and the eNodeB may not be able to determine channel conditions for the deactivated component carrier. Moreover, because the UE may have discontinued monitoring the PDCCH and PDSCH for the component carrier while in the deactivated state, a significant amount of time may pass without receiving relevant power controls commands.

Reactivation of a deactivated component carrier is a relatively simple, low-overhead procedure that does not involve configuration steps such as establishing an initial power control state for the reactivated CC. When a component carrier that had been deactivated is reactivated, the previously stored power control parameters will not have been updated, even if channel conditions have changed while the component carrier was deactivated. As a result, the transmit power control settings of a UE for an uplink component carrier that has been deactivated and reactivated may not be appropriate for channel conditions. This can be problematic, for example if the UE transmit power is set too high, in which case it may interfere with other wireless communications.

According to the present disclosure, an initial transmit power setting is selected for a UE to apply when a component carrier is reactivated. In one aspect, the initial power setting may be determined when the component carrier is deactivated and used by the UE upon the reactivation of the component carrier. For example, a power control parameter for establishing a power control state of an uplink component carrier may be set to zero when the uplink component carrier is deactivated. In this example, the power control state of the CC upon reactivation is not based upon the power control setting that was being used when the component carrier was deactivated. Rather, the UE drops the previous power control information and starts fresh upon reactivation, in response to the power control parameter. The UE may start transmitting on the reactivated CC at a power based on the downlink receive power, e.g. using outer loop power control. After the component carrier is reactivated the UE may receive further power control signals from the base station. This approach may be suitable, for example, after a lengthy deactivation period during which the channel conditions for the component carrier would likely change.

In another aspect, a power control parameter for setting transmit power on an uplink component carrier is frozen at its current value when the component carrier is deactivated. Upon reactivation, the UE may establish a power control adjustment state of the component carrier using the power control setting that was being used when the component carrier was deactivated. This approach may be suitable, for example, after short periods of deactivation during which the channel conditions for the component carrier are less likely to have substantially changed.

In another aspect, the UE may reduce a value of the power control parameter for an uplink component carrier after deactivation at a predetermined rate from an initial value. The initial value may be the same setting that was being used for the component carrier when it was deactivated. In this way, the power control state upon reactivation would match the pre-deactivation state if a deactivation period was short, and would decrease toward a power state based on the outer loop, for example, for longer deactivation periods.

Figure 8:
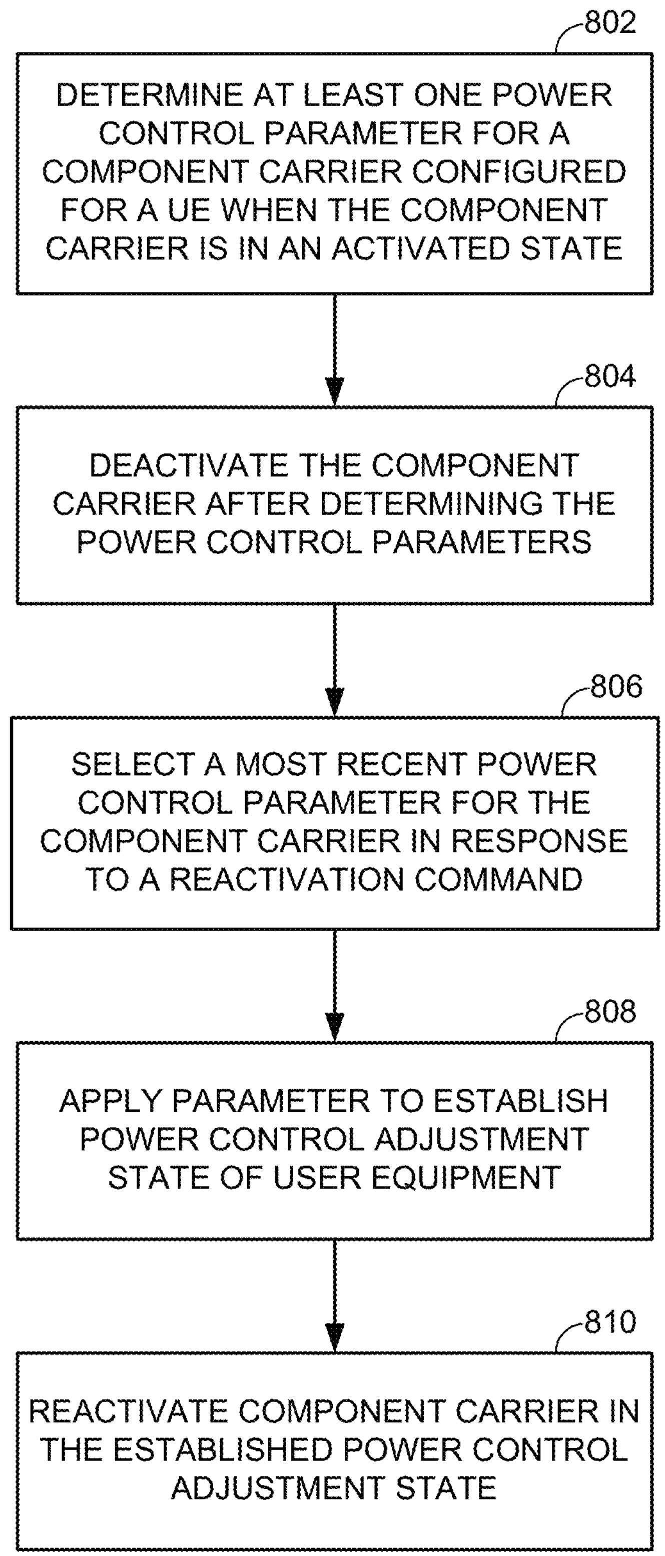
FIG. 8 is a block diagram illustrating a method for uplink power control according to one aspect of the present disclosure

FIG. 8 illustrates a method of controlling initial power upon reactivation of an uplink component carrier of a multi-carrier UE 120. Power control on a deactivated component carrier may be implemented according to aspects of the present disclosure, as described above. In block 802, at least one power control parameter is determined for at least one component carrier when the component carrier is in an activated state. In block 804, the component carrier is deactivated after the power control parameter(s) is determined. In block 806, the most recent power control parameter(s) is selected for the deactivated component carrier in response to a reactivation command. In block 808, the selected parameter(s) is applied to establish a power control adjustment of the UE. In block 810, the component carrier is reactivated in the established power control adjustment state.

According to aspects of the present disclosure, a UE can start performing outer loop measurement almost immediately after reactivation of the component carrier in order to perform open loop power control adjustments on the uplink. According to another aspect, the UE can perform a low duty cycle periodic measurement even during the deactivated period so that when the UE next needs to transmit it can do so based on the latest measurement rather than waiting for later measurements collected on the downlink.

Figure 9:
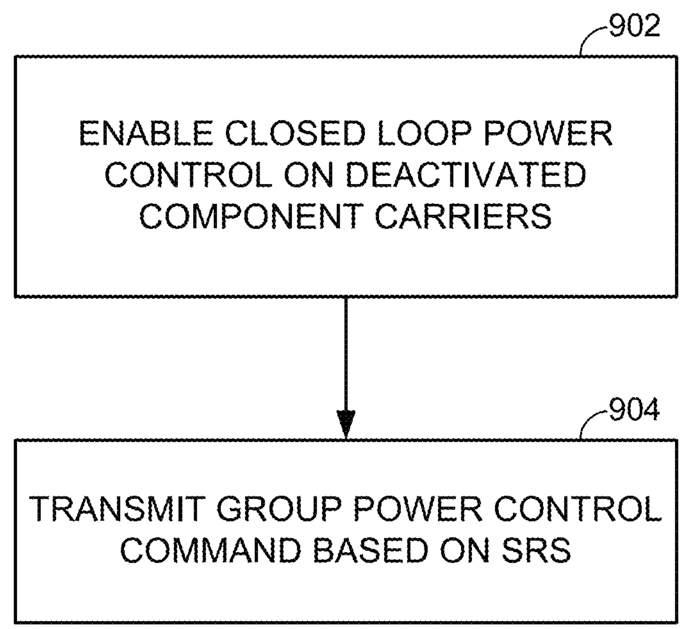
FIG. 9 is a block diagram illustrating a method for uplink power control according to one aspect of the present disclosure.

Another aspect of power control for a deactivated component carrier is described with reference to FIG. 9 in which power control on a deactivated component carrier may be implemented, closed loop power control based on a sounding reference signal (SRS) may be enabled on a deactivated component carrier in block 902. Such a closed loop power control scheme for reactivating uplink component carriers may include broadcasting group power control signals. Group power commands may be sent from a system information block 2 (SIB2) linked downlink component carrier or from a carrier indicator field (CIF) linked downlink component carrier, for example in block 904.

SIB2 downlink commands may be used, for example, to associate a downlink and a particular uplink carrier with each other in a multicarrier system. When a downlink carrier is deactivated, a UE may not be able to receive a grant for a corresponding uplink carrier. SIB2 commands may allow the uplink carrier to receive information from a different downlink carrier and to distinguish carriers involved in a group transmission, for example.

Figure 10:
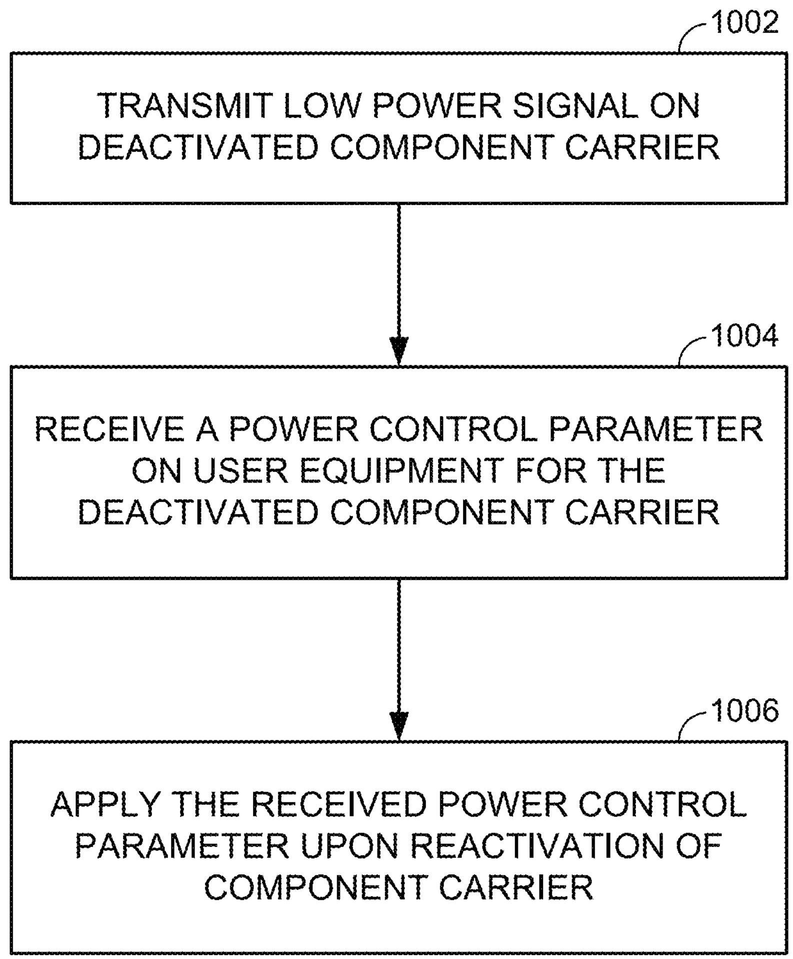
FIG. 10 is a block diagram illustrating a method for uplink power control according to one aspect of the present disclosure

Another aspect of the disclosure is described with reference to FIG. 10. Power control on a deactivated component carrier may be implemented with closed loop power control by allowing a UE to transmit a low power signal on a deactivated uplink component carrier in block 1002. The UE may then receive a power control parameter for the deactivated component carrier in block 1004. The UE may then apply the received power control parameter upon reactivation of the uplink component carrier in block 1006. This aspect provides closed loop power control for a deactivated component carrier in the same manner as power control is generally applied to activated component carriers.

An example of a power control parameter that may be applied to establish a power control adjustment state of a UE in accordance with aspects of the present disclosure is parameter f(i) which may be applied in the uplink power control formula specified in Technical Specification 3GPP TS 36.213.

In one configuration, the multi-carrier UE 120 includes means for accumulating power control parameters for a component carrier configured for the UE when the component carrier is in an activated state. Referring to FIG. 4, in one aspect, the means for determining at least one power control parameter for a component carrier when the component carrier is in an activated state may be the controller processor 480 and/or memory 482 configured to perform the functions recited by the determining means. The eNodeB 110 is also configured to include means for deactivating the component carrier after determining the power control parameters. In one aspect, the means for deactivating the component carrier after accumulating the power control parameters may be the controller processor 480 and/or memory 482 configured to perform the functions recited by the deactivating means.

In one configuration, the UE 120 also has means for selecting a most recent power control parameter value for the deactivated component carrier, in response to a reactivation command for the deactivated component carrier. In one aspect, the means for selecting a most recent power control parameter value for the deactivated component carrier may be the controller processor 480, and/or memory 482 configured to perform the functions recited by the selecting means.

In one configuration, the UE 120 includes means for applying the power control parameter value(s) to establish a power control adjustment state of the UE. In one aspect, the means for applying the selected power control parameter value may be the controller processor 480 and/or memory 482 configured to perform the functions recited by the means for applying the selected power control parameter value.

In one configuration, the UE 120 also includes means for reactivating the deactivated component carrier in the established power control adjustment state. In one aspect, means for reactivating the deactivated component carrier in the established power control adjustment state may be the controller processor 480, and/or memory 482 configured to perform the functions recited by the reactivating means.

Figure 11:
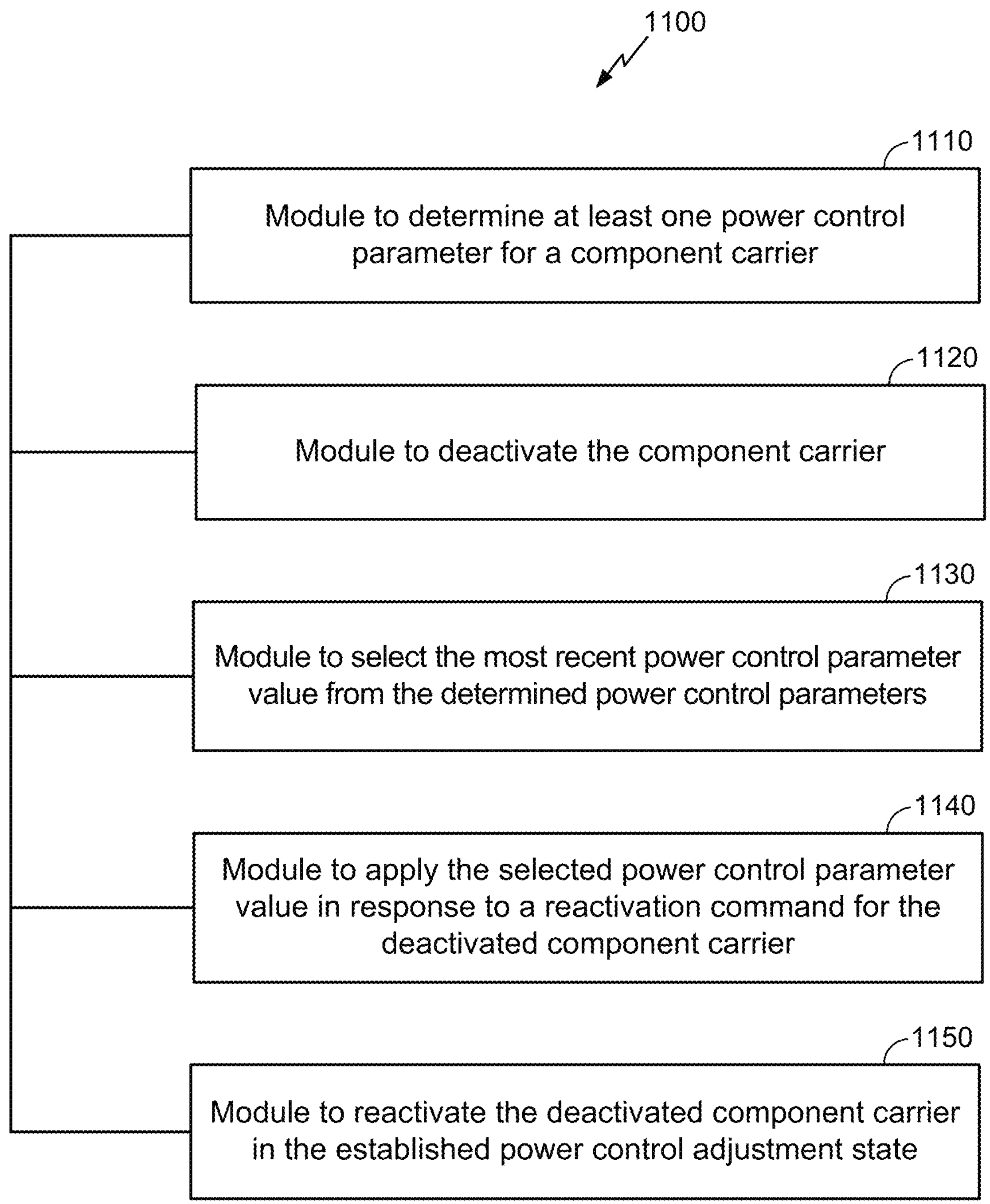
FIG. 11 is a block diagram illustrating components for uplink power control according to one aspect of the present disclosure.

FIG. 11 shows a design of an apparatus 1100 for a UE, such as the UE 120 of FIG. 4 in which power control on a deactivated component carrier may be implemented. The UE 1100 includes a module 1110 to determine at least one power control parameter for a component carrier configured for the UE when the component carrier is in an activated state. The UE also includes a module 1120 to deactivate the component carrier after determining the power control parameter(s). The UE also includes a module 1130 to select a most recent power control parameter value for the deactivated component carrier from the determined power control parameter(s), in response to a reactivation command for the deactivated component carrier. The UE also includes a module 1140 to apply the selected power control parameter value to establish a power control adjustment state of the UE. The UE also includes a module 1150 to reactivate the deactivated component carrier in the established power control adjustment state. The modules in FIG. 11 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a multi-carrier user equipment (UE), comprising:
- determining at least one power control parameter for a component carrier configured for the UE when the component carrier is in an activated state;
- deactivating the component carrier after determining the at least one power control parameter;
- selecting a most recent power control parameter value for the deactivated component carrier from the at least one power control parameter, in response to a reactivation command for the deactivated component carrier;
- applying the selected power control parameter value to establish a power control adjustment state of the UE; and
- reactivating the deactivated component carrier in the established power control adjustment state.

2. The method of claim 1, in which selecting the most recent power control parameter value comprises setting the at least one power control parameter value to zero.

3. The method of claim 1, in which selecting the most recent power control parameter value comprises suspending the at least one power control parameter value to a last power control parameter value that had been applied upon deactivation of the component carrier.

4. The method of claim 1, in which selecting the most recent power control parameter value comprises incrementally reducing a current value of the at least one power control parameter from the current value at a configured slew rate during a deactivation period.

5. The method of claim 1, in which the power control adjustment state comprises at least one of:
- a last power control adjustment state of the component carrier before the component carrier was deactivated, a power control adjustment state based upon the last power control adjustment state of the component carrier before the component carrier was deactivated, and a power control adjustment state independent of previous power control adjustment states of the component carrier.

6. The method of claim 1, in which the most recent power control parameter value is selected based upon a duration of deactivation of the component carrier.

7. The method of claim 1, in which the component carrier comprises a secondary component carrier.

8. The method of claim 1, in which the power control parameter is for at least one of an uplink data channel, an uplink control channel and an uplink reference signal.

9. The method of claim 1, further comprising periodically transmitting a sounding reference signal (SRS) on the deactivated component carrier.

10. The method of claim 1, further comprising periodically measuring a signal of the deactivated component carrier to enable setting of a power control adjustment state for outer loop power control.

11. A multi-carrier user equipment (UE), comprising:

means for determining at least one power control parameter for a component carrier configured for the UE when the component carrier is in an activated state;

means for deactivating the component carrier after determining the at least one power control parameter;

means for selecting a most recent power control parameter value for the deactivated component carrier from the at least one power control parameter, in response to a reactivation command for the deactivated component carrier;

means for applying the selected power control parameter value to establish a power control adjustment state of the UE; and means for reactivating the deactivated component carrier in the established power control adjustment state.

12. The UE of claim 11, in which the selecting means selects the most recent power control parameter value by setting the at least one power control parameter value to zero.

13. The UE of claim 11, in which the selecting means selects by suspending the at least one power control parameter value to a last power control parameter value that had been applied upon deactivation of the component carrier.

14. The UE of claim 11, in which the selecting means selects by incrementally reducing a current value of the at least one power control parameter from the current value at a configured slew rate during a deactivation period.

15. The UE of claim 11, in which the power control adjustment state comprises at least one of:

a last power control adjustment state of the component carrier before the component carrier was deactivated, a power control adjustment state based upon the last power control adjustment state of the component carrier before the component carrier was deactivated, and a power control adjustment state independent of previous power control adjustment states of the component carrier.

16. The UE of claim 11, in which the most recent power control parameter value is selected based upon a duration of deactivation of the component carrier.

17. The UE of claim 11, in which the component carrier comprises a secondary component carrier.

18. The UE of claim 11, in which the power control parameter is for at least one of an uplink data channel, an uplink control channel and an uplink reference signal.

19. The UE of claim 11, further comprising means for periodically transmitting a sounding reference signal (SRS) on the deactivated component carrier.

20. The UE of claim 11, further comprising means for periodically measuring a signal of the deactivated component carrier to enable setting of a power control adjustment state for outer loop power control.

21. A computer program product for a multicarrier user equipment (UE), comprising:

a non-transitory computer-readable medium having non-transitory program code recorded thereon, the program code comprising:

program code to determine at least one power control parameter for a component carrier configured for the UE when the component carrier is in an activated state;

program code to deactivate the component carrier after determining the at least one power control parameter;

program code to select a most recent power control parameter value for the deactivated component carrier from the at least one power control parameter, in response to a reactivation command for the deactivated component carrier;

program code to apply the selected power control parameter value to establish a power control adjustment state of the UE; and program code to reactivate the deactivated component carrier in the established power control adjustment state.

22. The computer program product of claim 21, in which the program code to select selects by setting the at least one power control parameter value to zero.

23. The computer program product of claim 21, in which the program code to select selects by suspending the at least one power control parameter value to a last power control parameter value that had been applied upon deactivation of the component carrier.

24. The computer program product of claim 21, in which the program code to select selects by incrementally reducing a current value of the at least one power control parameter from the current value at a configured slew rate during a deactivation period.

25. The computer program product of claim 21, in which the power control adjustment state comprises at least one of:

a last power control adjustment state of the component carrier before the component carrier was deactivated, a power control adjustment state based upon the last power control adjustment state of the component carrier before the component carrier was deactivated, and a power control adjustment state independent of previous power control adjustment states of the component carrier.

26. The computer program product of claim 21, in which the most recent power control parameter value is selected based upon a duration of deactivation of the component carrier.

27. The computer program product of claim 21, in which the component carrier comprises a secondary component carrier.

28. The computer program product of claim 21, in which the power control parameter is for at least one of an uplink data channel, an uplink control channel and an uplink reference signal.

29. The computer program product of claim 21, further comprising program code to periodically transmit a sounding reference signal (SRS) on the deactivated component carrier.

30. The computer program product of claim 21, further comprising program code to periodically measure a signal of the deactivated component carrier to enable setting of a power control adjustment state for outer loop power control.

31. A multicarrier user equipment (UE), comprising a memory;

at least one processor coupled to the memory and configured:

to determine at least one power control parameter for a component carrier configured for the UE when the component carrier is in an activated state;

to deactivate the component carrier after determining the at least one power control parameter;

to select a most recent power control parameter value for the deactivated component carrier from the at least one power control parameter, in response to a reactivation command for the deactivated component carrier;

to apply the selected power control parameter value to establish a power control adjustment state of the UE; and to reactivate the deactivated component carrier in the established power control adjustment state.

32. The UE of claim 31, in which the at least one processor selects by setting the at least one power control parameter value to zero.

33. The UE of claim 31, in which the at least one processor selects by suspending the at least one power control parameter value to a last power control parameter value that had been applied upon deactivation of the component carrier.

34. The UE of claim 31, in which the at least one processor selects by incrementally reducing a current value of the at least one power control parameter from the current value at a configured slew rate during a deactivation period.

35. The UE of claim 31, in which the power control adjustment state comprises at least one of:

a last power control adjustment state of the component carrier before the component carrier was deactivated, a power control adjustment state based upon the last power control adjustment state of the component carrier before the component carrier was deactivated, and a power control adjustment state independent of previous power control adjustment states of the component carrier.

36. The UE of claim 31, in which the most recent power control parameter value is selected based upon a duration of deactivation of the component carrier.

37. The UE of claim 31, in which the component carrier comprises a secondary component carrier.

38. The UE of claim 31, in which the power control parameter is for at least one of an uplink data channel, an uplink control channel and an uplink reference signal.

39. The UE of claim 31, in which the at least one processor is further configured to periodically transmit a sounding reference signal (SRS) on the deactivated component carrier.

40. The UE of claim 31, in which the at least one processor is further configured to periodically measure a signal of the deactivated component carrier to enable setting of a power control adjustment state for outer loop power control.

* * * * *